UNITED STATES PATENT OFFICE.

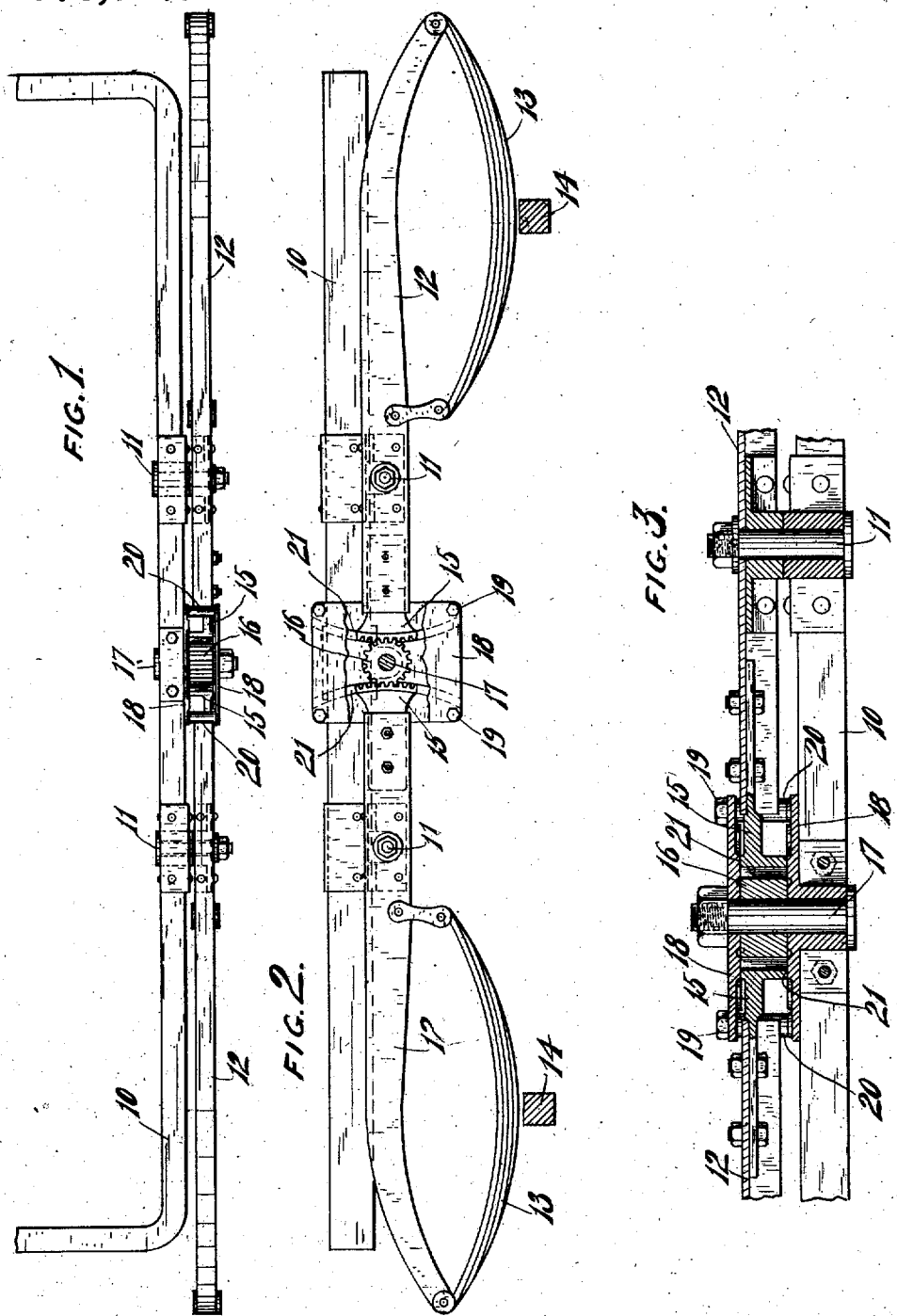

WILLIAM KOOTZ, OF MILWAUKEE, WISCONSIN.

VEHICLE-FRAME.

973,517.   Specification of Letters Patent.   Patented Oct. 25, 1910.

Application filed April 20, 1910.   Serial No. 556,473.

*To all whom it may concern:*

Be it known that I, WILLIAM KOOTZ, residing in Milwaukee, in the county of Milwaukee and State of Wisconsin, have invented new and useful Improvements in Vehicle-Frames, of which the following is a description, reference being had to the accompanying drawings, which are a part of this specification.

This invention has for its object to provide an automobile frame of such a construction that the jar received by one set of springs will be partly transferred to the other set of springs so as to be shared therewith and thus relieve the body of the vehicle from the effects thereof.

With the above object in view the invention consists of an automobile frame in which the front wheels and the rear wheels are mounted on levers fulcrumed to the main frame and geared together by means of segmental racks carried thereby meshing with a pinion mounted on the main frame so that the compression of one set of springs will impart a movement to their levers which will be transmitted through the segmental racks and the pinion to the levers of the other set of springs and compress them also.

With the above and other objects in view the invention consists in the automobile frame herein claimed and all equivalents.

Referring to the accompanying drawings in which like characters of reference indicate the same parts in the different views: Figure 1 is a plan view of one side of an automobile frame constructed in accordance with this invention, the other side thereof being a duplicate of what is here shown; Fig. 2 is a side elevation thereof; and, Fig. 3 is an enlarged sectional view through the pinion and the fulcrum of one of the levers.

In these drawings 10 indicates the main frame of the automobile, which instead of having the axle springs connected directly thereto as usual, has a pair of fulcrum bolts 11 at each side on which levers 12 are pivotally mounted, the springs 13 for the axles 14 being carried beneath the outer ends of said levers. Each of the levers 12 has a segmental rack 15 secured to its inner end to mesh with a pinion 16 which is mounted on a stud or bolt 17 projecting from the main frame 10. The pinion and segmental racks are preferably guided between a pair of rectangular plates 18 which are connected at their corners by bolts 19 with sleeves 20 thereon spacing the plates apart. The inner faces of the guide plates 18 are desirably provided with raised arc-shaped guide ribs 21 against which the broad rack edges of the segmental racks 15 bear in their oscillating movements, to be held against lateral displacement.

By means of this invention the front and rear axle springs share the jolt received by either of them, and thereby materially relieve the main frame from the effect of said jolt. When the wheels of the front axle meet with an obstruction in the road which causes the compression of the front axle springs, instead of such compression reacting entirely upon the vehicle frame at its front end, the levers 12 carrying the front axle are caused to swing on their fulcrum connections 11 so as to swing their segmental racks 15 downwardly. This causes the rotation of the pinions 15 and a corresponding upward movement of the segmental racks 15 of the other levers and consequently a downward movement of the ends of said levers to which the rear axle springs are connected, which downward movement will be resisted by the rear axle springs. Likewise an obstruction met with by the rear wheels of the vehicle will correspondingly cause the jolt to be shared between the rear axle springs and the front axle springs and relieve the vehicle body therefrom to a great extent.

The result following the employment of a vehicle frame constructed in accordance with this invention will be that the vehicle will ride easier and the springs will last longer, since they are not subjected to the full force of a blow received by the wheels mounted on them, but share such blow with the other springs.

What I claim as new and desire to secure by Letters Patent is—

1. A vehicle frame, comprising a main frame, levers pivotally mounted thereon, axle springs connected with the levers, segmental racks carried by the levers, and a pinion mounted on the main frame and meshing with the segmental racks for causing a movement of one lever to be imparted to the other lever.

2. A vehicle frame, comprising a main frame, levers fulcrumed at each side of the main frame, axle springs mounted on the levers, segmental racks carried by the levers, a pair of guide plates spaced apart and mounted on the main frame with the segmental racks guided therebetween, and a pinion mounted on the main frame and meshing with the segmental racks to cause the movements of one lever to impart movements to the other lever.

In testimony whereof, I affix my signature, in presence of two witnesses.

WILLIAM KOOTZ.

Witnesses:
R. S. C. CALDWELL,
ALMA A. KLUG.